United States Patent Office 2,770,559
Patented Nov. 13, 1956

2,770,559
HEAT SEALING LACQUER COATED FILM AND METHOD OF PRODUCING SAME

William Basil Horback, Irvington, N. J., assignor to Celanese Corporation of America, New York, N. Y., a corporation of Delaware No Drawing. Application February 23, 1954, Serial No. 412,060

17 Claims. (Cl. 117—76)

This invention relates to coated films and relates more particularly to coated organic acid ester of cellulose films that are heat sealable and that have good resistance to the passage of water vapor.

Organic acid ester of cellulose films such as cellulose acetate films are widely used for many purposes, as in the production of packages and the like. While the properties of the cellulose acetate films render them well suited for such applications, the said films are not readily heat sealable and have a relatively high permeability to water vapor. As a result, the utility of the cellulose acetate films in certain fields is limited. Attempts have been made to improve the heat sealability and resistance to the passage of water vapor of the cellulose acetate films by applying to the said films suitable heat-sealing lacquers. For example, it has been proposed to apply to the cellulose acetate films heat-sealing lacquers similar to those employed in coating regenerated cellulose films to impart to the latter films good heat sealability and good resistance to the passage of water vapor. However, the coated cellulose acetate films prepared in this manner are not commercially acceptable and have not come into use, primarily because they cannot be heat-sealed to produce a satisfactory bond owing to the low degree of adhesion of the heat-sealing lacquer to the cellulose acetate films.

It is an important object of this invention to provide coated organic acid ester of cellulose films which will be free from the foregoing and other difficulties.

A further object of this invention is to provide coated organic acid ester of cellulose films that are heat sealable and have good resistance to the passage of water vapor.

Other objects of this invention will be apparent from the following detailed description and claims.

According to the present invention either one or both surfaces of organic acid ester of cellulose films, such as cellulose acetate films, are first coated with a di-(alkoxymethyl)-ethylene urea or thiourea and are then over-coated with a heat-sealing lacquer that has good heat sealing properties and, if desired, high resistance to the passage of water vapor. The cellulose acetate films treated in this manner can be heat sealed to produce a strong bond. In addition, they exhibit good resistance to the passage of water vapor so that they are well suited for application in situations where these properties are required.

To apply the di-(alkoxymethyl)-ethylene urea or thiourea to the cellulose acetate films, the di-(alkoxymethyl)-ethylene urea or thiourea is dissolved in a solvent which will not adversely effect the cellulose acetate films and the resulting solution is coated onto the film, following which the film is dried and heated to a temperature of between about 70 and 100° C. for a period of between about 0.5 and 5 minutes to set the di-(alkoxymethyl)-ethylene urea or thiourea. Solvents that may be employed for preparing the coating solution include, for example, toluene, benzene; and mixtures of toluene and hexone, toluene, isopropanol and hexone, isopropyl acetate, toluene and hexone; and butyl acetate and toluene. The concentration of the urea or thiourea in the coating solution may range between about 0.5 and 10% by weight. The rate of application of the coating solution should be such as to deposit on the cellulose acetate films between about 0.01 and 1.0 pound of the di-(alkoxymethyl)-ethylene urea or thiourea per ream (3000 square feet) of surface treated. Suitable di-(alkoxymethyl)-ethylene ureas or thioureas that may be employed in preparing the coating solution include, for example, di-(methoxymethyl)-ethylene urea, di-(ethoxymethyl)-ethylene urea, di-(propoxymethyl)-ethylene urea, and di-(butyoxymethyl)-ethylene urea, as well as the corresponding thioureas.

The coating solution containing the di-(alkoxymethyl)-ethylene urea or thiourea may also contain from about 0.01 to 1% by weight of an acid catalyst such as, for example, oxalic acid, maleic acid, succinic acid, glycolic acid or an alkyl amino hydrochloride. However, if desired, the acid catalyst may be omitted from the coating solution containing the di-(alkoxymethyl)-ethylene urea and incorporated into the heat-sealing lacquer composition as set forth more fully below. The acid catalyst may also be omitted entirely. The function of the acid catalyst is to accelerate the reaction that apparently occurs between the cellulose acetate and the di-(alkoxymethyl)-ethylene urea or thiourea, but this reaction will take place, though at a slower rate, even in the absence of such catalyst. Onto the cellulose acetate films to which the di-(alkoxymethyl)-ethylene urea or thiourea has been applied and dried, there is then coated a heat-sealing lacquer. As is well known in the art, the heat sealing lacquer comprises a film-forming material such as, for example, cellulose nitrate, ethyl cellulose, chlorinated rubber or cyclized rubber, a plasticizer for the film-forming material, and a blending agent, all dissolved in a suitable solvent or solvent mixture. The heat-sealing lacquer may also contain a waterproofing agent such as, for example, a wax including the true waxes as well as paraffin wax where it is desired to impart to the cellulose acetate films a good resistance to the passage of water vapor. Plasticizers that are suitable for formulating the heat-sealing lacquer include, for example, dibutyl phthalate, dioctyl phthalate, dicyclohexyl phthalate, tricresyl phosphate, castor oil and alkyd type polymeric materials. To increase the compatability of the film-forming material and the wax there is also included in the heat-sealing lacquer a blending agent which may be a resin or gum. The heat-sealing lacquer is applied to the cellulose acetate films from solution in a suitable solvent mixture which may, for example, be a mixture of toluene, hexone and isopropyl alcohol, or a mixture of toluene, isopropyl acetate and butyl alcohol. Good results are obtained when between about 1 to 3 pounds of solids per ream of the heat-sealing lacquer are applied.

The cellulose acetate films which have been coated with a di-(alkoxymethyl)-ethylene urea or thiourea and then with a heat-sealing lacquer in the manner described above can be heat-sealed to produce a bond of high strength acceptable for commercial use. It has been found, however, that the heat seal bond may be improved even further, particularly with respect to the aging properties of said bond, by incorporating in the heat-sealing lacquer from about 0 to 10% by weight of the di-(alkoxymethyl)-ethylene urea or thiourea based on the total solids in the lacquer. There may also be included in the heat-sealing lacquer from about 0.01 to 1% by weight of an acid catalyst based on the total solids in the lacquer. The acid catalyst may be included in the heat-sealing lacquer whether or not it is also included in the di-(alkoxymethyl)- ethylene urea or thiourea coating solution and whether or not the heat-sealing lacquer itself contains any di-(alkoxymethyl)-ethylene urea or thiourea. Surprisingly enough, it has been found that while the inclusion of the di-(alkoxymethyl)-ethylene urea or thiourea into the heat-sealing lacquer improves the strength of the heat seal bonds obtained when said modified heat-sealing lacquer is applied to cellulose acetate films that have been treated with a di-(alkoxymethyl)-ethylene urea or thiourea, it has no effect on the strength of the heat seal bonds when said modified heat-sealing lacquer is applied to untreated cellulose acetate films.

The invention will now be described specifically in connection with its application to cellulose acetate films. However, it may also be employed for the treatment of other organic acid ester of cellulose films such as, for example, cellulose propionate, cellulose butyrate, cellulose acetate propionate and cellulose acetate butyrate films.

The following examples are given to illustrate this invention further.

Example I

A cellulose acetate film is coated with a solution of 10 parts by weight of di-(methoxymethyl)-ethylene urea and 0.1 part by weight of an alkyl amine hydrochloride (catalyst AC) dissolved in a mixture of 544.5 parts by weight of toluene, 197.9 parts by weight of isopropanol and 247.5 parts by weight of hexone to deposit 0.2 pound per ream of the di-(methoxymethyl)-ethylene urea onto both sides of the film. After coating, the cellulose acetate film is dried at a temperature of 95° C. for 1 to 2 minutes. The cellulose acetate film is then coated to deposit one pound per ream of solids of a heat-sealing lacquer from a solution containing 95.0 parts by weight of 0.5 second nitrocellulose, 8.0 parts by weight of paraffin wax (M. P. 60° C.), 20.0 parts by weight of di-ethylene glycol ester of terpene-maleic anhydride polybasic acid (Petrex 7–75T Resin), 33.0 parts by weight of dibutyl phthalate, 33.0 parts by weight of dicyclohexyl phthalate and 10 parts by weight of a polymerized rosin (Polypale Resin), all dissolved in a mixture of 440.6 parts by weight of toluene, 200.0 parts by weight of hexone and 160.4 parts by weight of isopropanol. After drying, the coated film is heat-sealed to itself. The strength of the heat seal is approximately 7 times that of a heat seal obtained when the same heat-sealing lacquer is applied to a previously untreated film.

Example II

A cellulose acetate film is coated with a solution of 100 parts by weight of di-(methoxymethyl)-ethylene urea dissolved in a mixture of 491 parts by weight of toluene, 229 parts by weight of hexone and 180 parts by weight of isopropanol to deposit 0.2 pound per ream of the di-(methoxymethyl)-ethylene urea onto both sides of the film. After coating, the cellulose acetate film is dried at a temperature of 90° C. for 1 minute. The cellulose acetate film is then coated to deposit 2 pounds per ream of solids of a heat-sealing lacquer from a solution containing 95.0 parts by weight of 0.5 second nitrocellulose. 8.0 parts by weight of paraffin wax (M. P. 60° C.), 20.0 parts by weight of Petrex 7–75T Resin, 33.0 parts by weight of dibutyl phthalate, 33.0 parts by weight of dicyclohexyl phthalate, 10.0 parts by weight of a polymerized rosin (Polypale Resin), and 19.9 parts by weight of di-(methoxymethyl)-ethylene urea, all dissolved in 426.5 parts by weight of toluene, 198.4 parts by weight of hexone and 156.2 parts by weight of isopropanol. After drying, the coated film is heat-sealed to itself. The strength of the heat seal is approximately 5 times that of a heat seal obtained when the same heat-sealing lacquer is applied to a previously untreated film.

It is to be understood that the foregoing detailed description is given merely by way of illustration and that many variations may be made therein without departing from the spirit of my invention.

Having described my invention what I desire to secure by Letters Patent is:

1. An organic acid ester of cellulose film coated with a member of the class consisting of di-(alkoxymethyl)-ethylene ureas and thioureas and having applied to said coating a heat-sealing lacquer.

2. An organic acid ester of cellulose film coated with between about 0.01 and 1.0 pound per ream of a member of the class consisting of di-(alkoxymethyl)-ethylene ureas and thioureas and having applied to said coating between about 1 and 1.5 pounds per ream of a heat-sealing lacquer.

3. A cellulose acetate film coated with a member of the class consisting of di-(alkoxymethyl)-ethylene ureas and thioureas and having applied to said coating a heat-sealing lacquer.

4. An organic acid ester of cellulose film coated with di-(methoxymethyl)-ethylene urea and having applied to said coating a heat-sealing lacquer.

5. A cellulose acetate film coated with di-(methoxymethyl)-ethylene urea and having applied to said coating a heat-sealing lacquer.

6. An organic acid ester of cellulose film coated with a member of the class consisting of di-(alkoxymethyl)-ethylene ureas and thioureas and having applied to said coating a heat-sealing lacquer containing as an additive a member of the class consisting of di-(alkoxymethyl)-ethylene ureas and thioureas.

7. A cellulose acetate film coated with a member of the class consisting of di-(alkoxymethyl)-ethylene ureas and thioureas and having applied to said coating a heat-sealing lacquer containing as an additive a member of the class consisting of di-(alkoxymethyl)-ethylene ureas and thioureas.

8. A cellulose acetate film coated with di-(methoxymethyl)-ethylene urea and having applied to said coating a heat-sealing lacquer containing as an additive di-(methoxymethyl)-ethylene urea.

9. A cellulose acetate film coated with between about 0.01 and 1.0 pound per ream of di-(methoxymethyl)-ethylene urea and having applied to said coating between about 1 and 1.5 pounds per ream of a heat-sealing lacquer containing as an additive di-(methoxymethyl)-ethylene urea.

10. An organic acid ester of cellulose film coated with a member of the class consisting of di-(alkoxymethyl)-ethylene ureas and thioureas and having applied to said coating a heat-sealing lacquer comprising a film-forming material, a plasticizer for the film-forming material and a waterproofing agent.

11. A process which comprises coating an organic acid ester of cellulose film with a member of the class consisting of di-(alkoxymethyl)-ethylene ureas and thioureas, and applying to said coating a heat-sealing lacquer.

12. A process which comprises coating an organic acid ester of cellulose film with a member of the class consisting of di-(alkoxymethyl)-ethylene ureas and thioureas, drying said coating at a temperature of between about 70 and 100° C. for a period of between about 0.5 and 5 minutes, and applying to said coating a heat-sealing lacquer.

13. A process which comprises coating an organic acid ester of cellulose film with a member of the class consisting of di-(alkoxymethyl)-ethylene ureas and thioureas and an acid catalyst, drying said coating at a temperature of between about 70 and 100° C. for a period of between about 0.5 and 5 minutes, and applying to said coating a heat-sealing lacquer.

14. A process which comprises coating an organic acid ester of cellulose film with a member of the class consisting of di-(alkoxymethyl)-ethylene ureas and thioureas, drying said coating at a temperature of between about 70 and 100° C. for a period of between about 0.5 and 5 minutes, and applying to said coating a heat-sealing lacquer containing an acid catalyst.

15. A process which comprises coating an organic acid ester of cellulose film with a member of the class consisting of di-(alkoxymethyl)-ethylene ureas and thioureas and an acid catalyst, drying said coating at a temperature of between about 70 and 100° C. for a period of between about 0.5 and 5 minutes, and applying to said coating a heat-sealing lacquer containing an acid catalyst.

16. A process which comprises coating a cellulose acetate film with a member of the class consisting of di-(alkoxymethyl)-ethylene ureas and thioureas, and applying to said coating a heat-sealing lacquer.

17. A process which comprises coating a cellulose acetate film with di-(methoxymethyl)-ethylene urea, and applying to said coating a heat-sealing lacquer.

References Cited in the file of this patent
UNITED STATES PATENTS

| | | |
|---|---|---|
| 1,867,658 | Dreyfus | July 19, 1932 |
| 2,212,152 | Cupery | Aug. 20, 1940 |